(12) United States Patent
Megli et al.

(10) Patent No.: US 7,260,467 B2
(45) Date of Patent: Aug. 21, 2007

(54) CYLINDER DEACTIVATION METHOD TO MINIMIZE DRIVETRAIN TORSIONAL DISTURBANCES

(75) Inventors: Thomas W. Megli, Dearborn, MI (US); Nate Trask, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 10/734,555

(22) Filed: Dec. 12, 2003

(65) Prior Publication Data

US 2005/0131618 A1    Jun. 16, 2005

(51) Int. Cl.
*G06G 7/70* (2006.01)

(52) U.S. Cl. ............................. 701/101; 701/108

(58) Field of Classification Search ............... 701/101, 701/110, 112, 114; 60/284, 285; 123/198 F, 123/198 D, 90.23, 90.15, 339.15, 339.17; 73/117.1, 117.3, 118.1, 118.2
See application file for complete search history.

(56) References Cited

U.S. PATENT DOCUMENTS

| | | | |
|---|---|---|---|
| 6,138,636 A | 10/2000 | Kohno et al. | 123/198 F |
| 6,192,857 B1 | 2/2001 | Shimada | 123/322 |
| 6,192,867 B1 | 2/2001 | Fenchel et al. | |
| 6,318,348 B1 * | 11/2001 | Xu | 123/568.14 |
| 6,332,446 B1 * | 12/2001 | Matsumoto et al. | 123/198 F |
| 6,431,154 B1 | 8/2002 | Inoue | |
| 6,435,156 B1 * | 8/2002 | Copus | 123/198 F |
| 6,526,745 B1 | 3/2003 | Ogiso | 60/285 |
| 6,561,145 B1 * | 5/2003 | Stockhausen et al. | 123/90.15 |
| 6,857,264 B2 * | 2/2005 | Ament | 60/284 |
| 2003/0164148 A1 | 9/2003 | Andrian-Werburg | |

* cited by examiner

*Primary Examiner*—Willis R. Wolfe
*Assistant Examiner*—Johnny H. Hoang
(74) *Attorney, Agent, or Firm*—Allan J. Lippa; Alleman Hall McCoy Russell & Tuttle LLP

(57) ABSTRACT

A system and method are described for reducing engine vibration during cylinder deactivation in selected operating conditions. The method utilizes open valve deactivation to better match the cylinder pressure of deactivated cylinders to combusting cylinders. This mode is utilized, along with cylinder closed valve cylinder deactivation, to improve overall fuel economy, while at the same time reducing vibration felt by the vehicle driver.

24 Claims, 10 Drawing Sheets

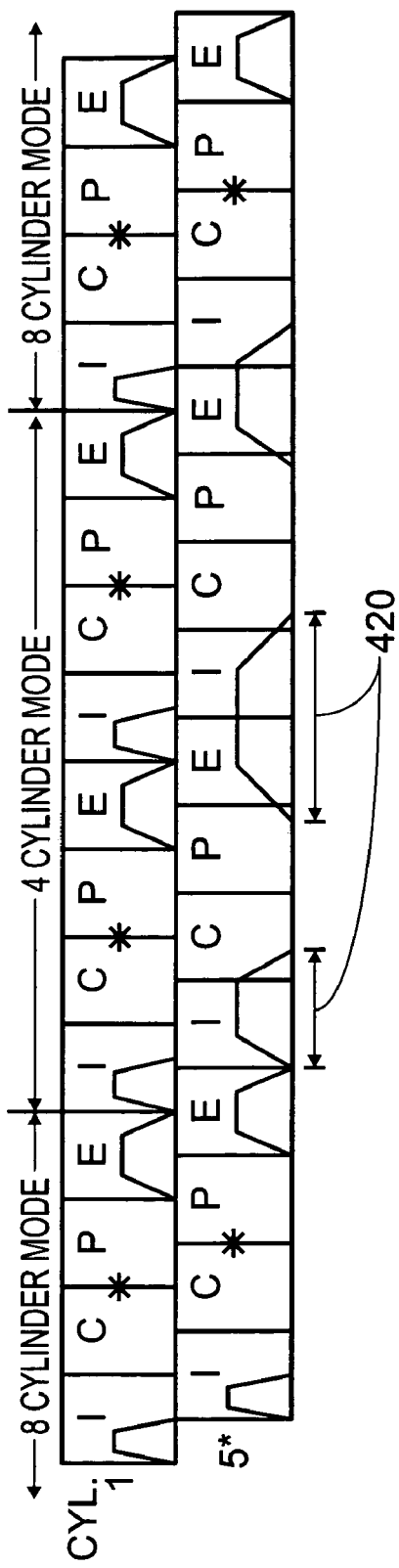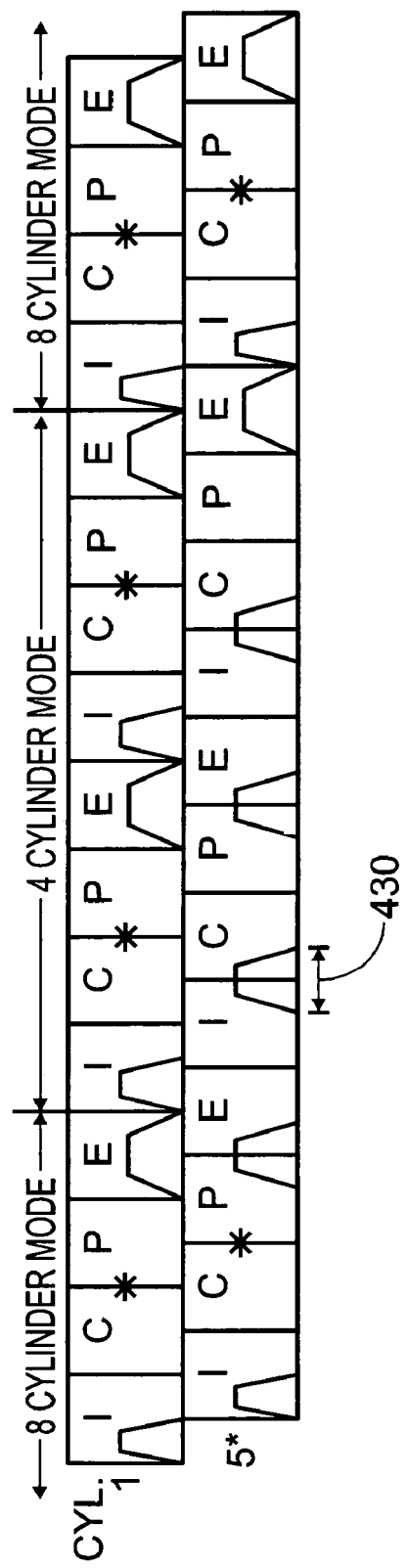
Fig. 4D
Fig. 4E

CYLINDER DEACTIVATION METHOD TO MINIMIZE DRIVETRAIN TORSIONAL DISTURBANCES

FIELD OF THE INVENTION

The present invention relates generally to systems for reducing drivetrain torsional disturbances when deactivating combustion in groups of cylinders in an internal combustion engine of a vehicle traveling on the road, and more particularly to using opening and closing of valves in the deactivated cylinders to reduce said torsionals.

BACKGROUND OF THE INVENTION

Internal combustion engines generally produce engine output torque by performing combustion in the engine cylinders. Specifically, each cylinder of the engine inducts air and fuel and combusts the air-fuel mixture, thereby increasing pressure in the cylinder to generate torque to rotate the engine crankshaft via the pistons. One method to improve engine fuel economy is to deactivate a selected group of cylinders to thereby raise manifold pressure and reduce pumping work of the remaining cylinders carrying out combustion. The cylinder deactivation can be accomplished by mechanically deactivating the intake and exhaust valves of the selected cylinders.

The inventors herein have recognized a problem with such an approach. Specifically, during the cylinder deactivation mode, the imbalance between the torque produced in cylinders carrying out combustion, and the torque of the deactivated cylinders can cause increased engine vibration and harshness. Such vibration and harshness can be experienced by the vehicle operator and thereby reduce vehicle drive feel.

One approach to reduce the engine torque variation caused by deactivated cylinders is described in U.S. Pat. No. 6,332,446. In this method, where particular cylinders are deactivated under cylinder deactivation control, the exhaust valve of each deactivated or inactive cylinder is opened for a certain period of time which starts ahead of the bottom dead center of piston movement. The timing of opening the exhaust valves is determined so that the pressure within the inactive cylinder is equal to or lower than the atmospheric pressure when the exhaust valve is open. The timing of closing the exhaust valve is determined so that the peak value of the pressure within the inactive cylinder becomes almost equal to the peak value of pressure within active cylinders.

The inventors of the present invention have recognized still further disadvantages with the approach of U.S. Pat. No. 6,332,446. Specifically, the method utilized for cylinder deactivation in this approach can degrade fuel economy since additional power is utilized to open and close the exhaust valve in the deactivated cylinders. In other words, energy is utilized to open and close the exhaust valve in deactivated cylinders, yet the cylinders do not produce any significant net torque to assist engine rotation. As such, even when the torque variation caused by cylinder deactivation may be unnoticed by the driver, energy is spent opening and closing the exhaust valve of deactivated cylinders thereby degrading overall engine efficiency. In addition to the electrical losses associated with opening and closing the valves, further fuel economy degradation occurs because the heat and mass losses from the trapped gas in the cylinders increase due to the higher pressures and temperatures in the non-firing cylinders. Thus, further fuel is expended in the firing cylinders to overcome the parasitic gas cycle losses in the non-firing cylinders.

Finally, in the case where valves are opened at lower than atmospheric pressure, such operation can degrade fuel economy as it would increase the gas cycle losses in the inactive cylinders due to unrestrained expansion of the exhaust gas back into the cylinders.

Still another disadvantage of the approach described in U.S. Pat. No. 6,332,446 relates to increased oil consumption. In other words, in the case where the method of U.S. Pat. No. 6,332,446 requires pressure in the inactive cylinder to be lower than the atmospheric pressure during some conditions, the cylinder pressure is therefore also lower than the engine crank case pressure in some conditions. As such, the positive pressure in the crank case causes oil to transfer to the cylinder, which oil is in turn later burned during combustion causing increased engine emissions.

SUMMARY OF THE INVENTION

The above disadvantages are overcome by:

A system for an engine having at least a first and second cylinder, the cylinders each having at least an intake and an exhaust valve, the system comprising:

a controller configured to:

operate the engine in a first mode where at least both the first cylinder and second cylinder open and close at least both their respective intake and exhaust valves to induct air, combust said air with injected fuel, and exhaust combusted gas products;

operate the engine in a second mode where at least one of the first cylinder and second cylinder opens and closes its intake and exhaust valves to induct air, combust said air with injected fuel, and exhaust combusted gas products, and the other of said first and second cylinders opens and closes at least one of its intake and exhaust valves while maintaining at least one of its intake and exhaust valves closed;

operate the engine in a third mode where one of said first and second cylinders operates with at least both intake and exhaust valves closed during a cycle of the engine; and selecting at least one of said first, second and third modes based on an operating condition.

By utilizing both open and closed valve deactivation, depending on operating conditions, it is possible to both reduce engine vibration, while at the same time obtaining high fuel economy. In other words, in conditions where closed valve deactivation might otherwise cause excessive vibration, it is possible to reduce said vibration by utilizing open valve deactivation. Likewise, in conditions where such vibration may not be excessive or noticeable by the engine operator, it is possible to utilize closed valve deactivation and obtain higher fuel economy since energy is not spent opening and closing valves in cylinders not carrying out combustion.

In other words, the inventors of the present invention have been able to optimize overall engine performance, while at the same time retaining high customer satisfaction with drive feel.

Note that the present invention can be used with V-8 engines, I-4 engines, I-6 engines, V-6 engines, or various other types. Further, the various modes can be provided using electromechanically actuated valves, or via cam switching in mechanically actuated valves, for example.

BRIEF DESCRIPTION OF THE FIGURES

The above features, and advantages will be readily apparent from the following detailed description of an example embodiment of the invention when taken in connection with the accompanying drawings.

FIG. 4A-4E is a timing chart showing engine valve operation according one example of the present invention.

DETAILED DESCRIPTION OF EXAMPLE EMBODIMENT(S) OF THE INVENTION

Figure 1:
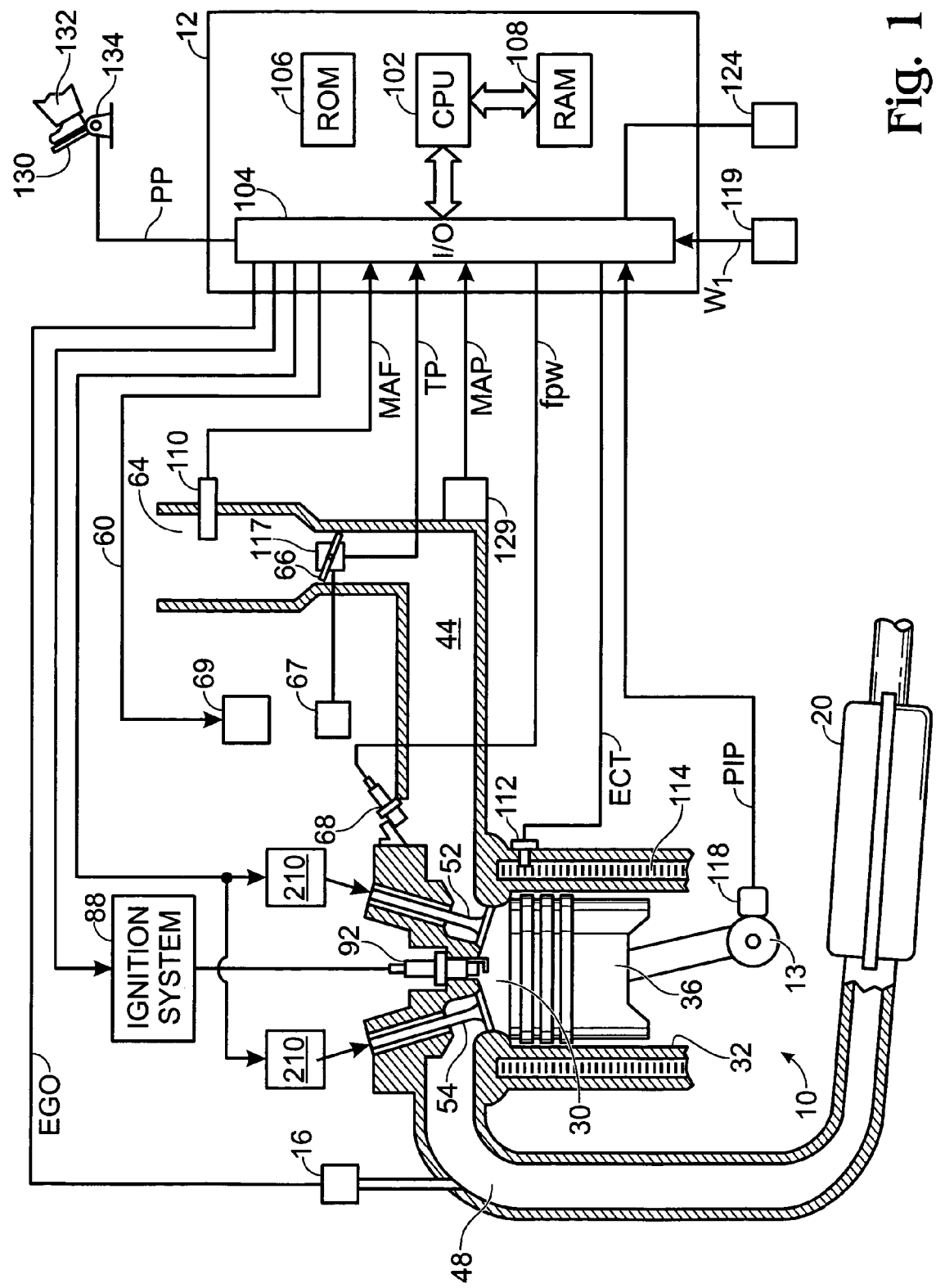
FIG. 1 is a block diagram of an engine illustrating various components related to the present invention.

Referring to FIG. 1, internal combustion engine 10 is shown. Engine 10 is an engine of a passenger vehicle or truck driven on roads by drivers. Engine 10 is coupled to torque converter via crankshaft 13. The torque converter is also coupled to transmission via turbine shaft. The torque converter has a bypass clutch which can be engaged, disengaged, or partially engaged. When the clutch is either disengaged or partially engaged, the torque converter is said to be in an unlocked state. The turbine shaft is also known as transmission input shaft. The transmission comprises an electronically controlled transmission with a plurality of selectable discrete gear ratios. The transmission also comprises various other gears such as, for example, a final drive ratio. The transmission is also coupled to tires via an axle. The tires interface the vehicle to the road.

Internal combustion engine 10 comprising a plurality of cylinders, one cylinder of which, shown in FIG. 1, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In one example, converter 20 is a three-way catalyst for converting emissions during operation about stoichiometry.

As described more fully below with regard to FIGS. 2a and 2b, at least one of, and potentially both, of valves 52 and 54 are controlled electronically via apparatus 210.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. In an alternative embodiment, no throttle is utilized and airflow is controlled solely using valves 52 and 54. Further, when throttle 66 is included, it can be used to reduce airflow if valves 52 or 54 become degraded, or if vacuum is desired to operate accessories or reduce induction related noise.

Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of manifold pressure from MAP sensor 129, a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of the turbine shaft (output of a torque converter, if equipped), and a profile ignition pickup signal (PIP) from Hall effect sensor 118 coupled to crankshaft 13 indicating an engine speed (N) and position. Alternatively, turbine speed may be determined from vehicle speed and gear ratio.

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Figure 2A:
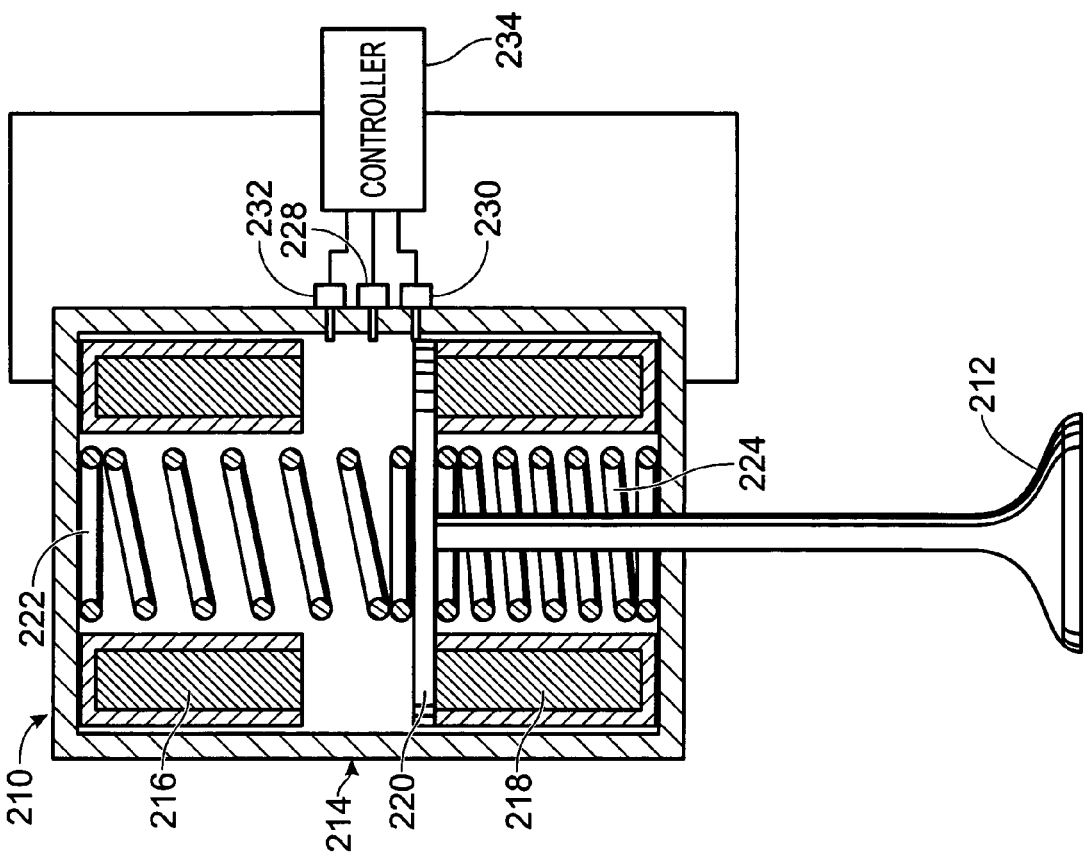
FIG. 2A shows a schematic vertical cross-sectional view of an apparatus for controlling valve actuation, with the valve in the fully closed position.
Figure 2B:
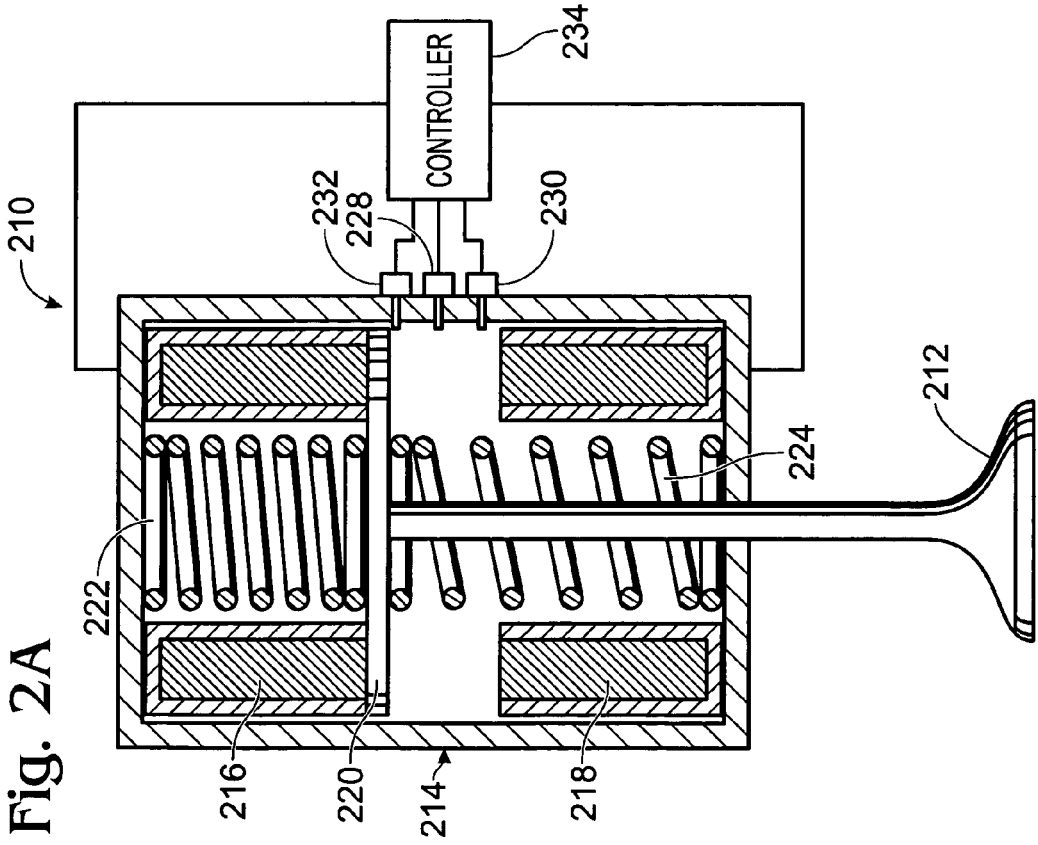
FIG. 2B shows a schematic vertical cross-sectional view of an apparatus for controlling valve actuation as shown in FIG. 1, with the valve in the fully open position.

Referring to FIGS. 2A and 2B, an apparatus 210 is shown for controlling movement of a valve 212 in camless engine 10 between a fully closed position (shown in FIG. 2A), and a fully open position (shown in FIG. 2B). The apparatus 210 includes an electromagnetic valve actuator (EVA) 214 with upper and lower coils 216, 218 which electromagnetically drive an armature 220 against the force of upper and lower springs 222, 224 for controlling movement of the valve 212.

Switch-type position sensors 228, 230, and 232 are provided and installed so that they switch when the armature 220 crosses the sensor location. It is anticipated that switch-type position sensors can be easily manufactured based on optical technology (e.g., LEDs and photo elements) and when combined with appropriate asynchronous circuitry they would yield a signal with the rising edge when the armature crosses the sensor location. It is furthermore anticipated that these sensors would result in cost reduction as compared to continuous position sensors, and would be reliable.

Controller 234 (which can be combined into controller 12, or act as a separate controller) is operatively connected to the position sensors 228, 230, and 232, and to the upper and lower coils 216, 218 in order to control actuation and landing of the valve 212.

The first position sensor 228 is located around the middle position between the coils 216, 218, the second sensor 230 is located close to the lower coil 218, and the third sensor 232 is located close to the upper coil 216.

While there are various methods to improve vehicle fuel economy using electrically actuated engine cylinder valves, cylinder deactivation is one approach that reduces engine pumping and heat transfer losses. In one example, a fraction of the cylinders are deactivated and the remaining cylinders are operated more efficiently to meet the engine power demand. Unfortunately, the use of cylinder deactivation is limited in some conditions by customer perceptions of increased vibration harshness. Cylinder deactivation can significantly reduce the frequency of and increase the amplitude of engine torsionals, so that the normal torque converter/flywheel and damper components can no longer adequately filter the torque disturbances to acceptable levels, especially at low engine speeds. For example, with a typical deactivation strategy, NVH (noise, vibration and harshness) caused by engine torsionals below 2000 RPM can cause degraded customer drive feel. This means that during a significant portion of the city drive cycle, cylinder deactivation with all valves deactivated may not be optimal (or acceptable to the customer).

An additional problem with cylinder deactivation is increased oil consumption. In prior methods of deactivation, the engine valves are closed, so that the trapped in-cylinder gases are compressed and expanded polytropically. Over a short period of time, heat transfer and mass loss across the ring pack reduce the minimum in-cylinder pressure to subatmospheric levels. During a significant fraction of the operating cycle, the in-cylinder pressures for the deactivated cylinders are significantly lower than the crankcase pressure. This can increase the oil transport from the crankcase into the cylinders, and the oil is subsequently burned when the cylinders are reactivated.

The present invention describes alternative methods for cylinder deactivation to address the above problems. It is especially suitable for electronic valve actuation engines because unusual intake and/or exhaust events are possible. However, the method can be extended to standard camshaft-type variable displacement engines if, for example, a cam profile switching mechanism is used to achieve deactivation. In this example, a cam profile switching mechanism can be selected where the profile is designed to provide optimal cancellation and fuel economy at a problematic speed load region for NVH.

As discussed above, cylinder deactivation can be achieved by deactivating all (the intake and exhaust) poppet valves in the closed position. This method minimizes the parasitic gas work losses in the non-firing cylinders but is not necessarily the most effective from an overall efficiency standpoint. A systems perspective would include, for example, the parasitic losses of the deactivating mechanism, which may or may not outweigh the gas work savings achieved by deactivating all of the valves. Also, the deactivation method can have a significant impact on the engine output torque signal, and this can have a significant impact on the range of operating conditions where cylinder deactivation can be used under a given set of customer NVH constraints.

The present invention employs an open valve deactivation (in combination with closed valve deactivation) to improve the engine torque characteristics and to reduce potential oil consumption problems while at the same time maintaining high fuel economy. In one implementation, the exhaust valves are deactivated (to prevent any unwanted breakthrough of air-flow to the catalyst), and the intake valves are open during the normal intake stroke, and then also during what would be the normal exhaust event. This mode of operation can result in no net airflow through the non-firing cylinder, if desired. The exact intake valve opening and closing times are selected to reduce losses and to obtain a desired torque signature as a function of engine load. The torque signature could be selected to minimize the amplitude of the low frequency content of the net engine torque profile. This essentially maintains an in-cylinder pressure near the intake manifold pressure during one half of the engine cycle, and increase the compression and expansion torque level during the other half-engine cycle. The compression and expansion processes are naturally phased so that the engine torque excursions are smoothed (the firing torque is used to compress the gas in the non-firing cylinders, and is subsequently recovered during the expansion process). For a V8 engine under light load conditions, the frequency content and shape of the engine torque are more similar to a full-firing engine. In another implementation, the intake valves are deactivated, and the exhaust valves are open during the normal exhaust stroke and during what would be the normal intake stroke. This mode of operation can also result in no net airflow through the non-firing cylinder, if desired. The exact exhaust valve opening and closing times are selected to reduce pumping losses and to obtain a selected the torque signature as a function of engine load. This exhaust valve open implementation could be utilized to prevent the cylinder walls from cooling excessively and avoid heating the charge in the intake manifold (Intake charge heating could make transient fuel compensation a difficult task when switching from a deactivated mode to an activated mode. Intake charge heating can also cause the firing cylinders to knock when running at high IMEP levels).

If desired, the intake valve open implementation could be used to achieve slightly better fuel economy than the exhaust implementation. In other words, since charge from the intake manifold is cooler, heat and mass transfer losses during compression and expansion (when the valves are closed) are lower than for the exhaust open case.

Adjustment of event timing can also be used during transitions to prevent oxygen and/or hydrocarbon breakthrough to the aftertreatment system. Because the intake and exhaust events have unusual timing and durations to reduce the pumping work in these examples, fully flexible valve timing, as in electronic valve actuation (EVA), is one architecture for implementation; however, the method could be employed by using cam profile switching mechanisms if the appropriate cam profiles are used for the deactivation operating mode.

It should be noted that the open exhaust valve (or open intake valve) type deactivation schemes could be employed where a short duration opening event roughly centered about BDC is used. Here, there is a compression and expansion of the cylinder gases during every revolution, and this may afford better cancellation of torsionals at higher loads for some engine architectures. However, under more typical lower speed and lighter load conditions, the heat and mass transfer losses during the compression and expansion are greater than the losses during gas exchange to and from the exhaust (or intake) manifold. Also more valve transitions are required in this embodiment, which increases parasitic losses; therefore, the longer open duration schemes (where the valves are open for at least a full revolution) reduce fuel consumption and can be used to provide increased fuel economy.

The invention has several advantages over prior cylinder deactivation approaches:

(1) The range of VDE operation can be extended to improve drive cycle fuel economy
(2) Cost can be minimized because system redesign (for example, torque converter clutch and damper) can be minimized
(3) Oil consumption can be reduced due to higher in-cylinder pressures.
(4) NVH is improved.
(5) Cylinder cooling can be reduced to simplify transient fuel compensation and reduce emissions The primary engine VDE control strategy can be modified to employ the open valve deactivation in appropriate engine/speed load regions to obtain the desired trade-offs between fuel economy, engine torsionals and oil consumption. For example, at higher engine speeds, the engine firing frequency is higher so that full valve deactivation may be used without inducing unacceptable driveline vibrations. This would optimize FE because the engine pumping losses would be minimized. At lower engine speeds and loads, open valve deactivation would be employed to minimize vibrations while still achieving cylinder deactivation fuel economy benefits. The open valve deactivation may also be periodically employed to raise the pressure level in the deactivated cylinder and thus reduce oil consumption. Such an approach is described more fully below.

Figure 3:
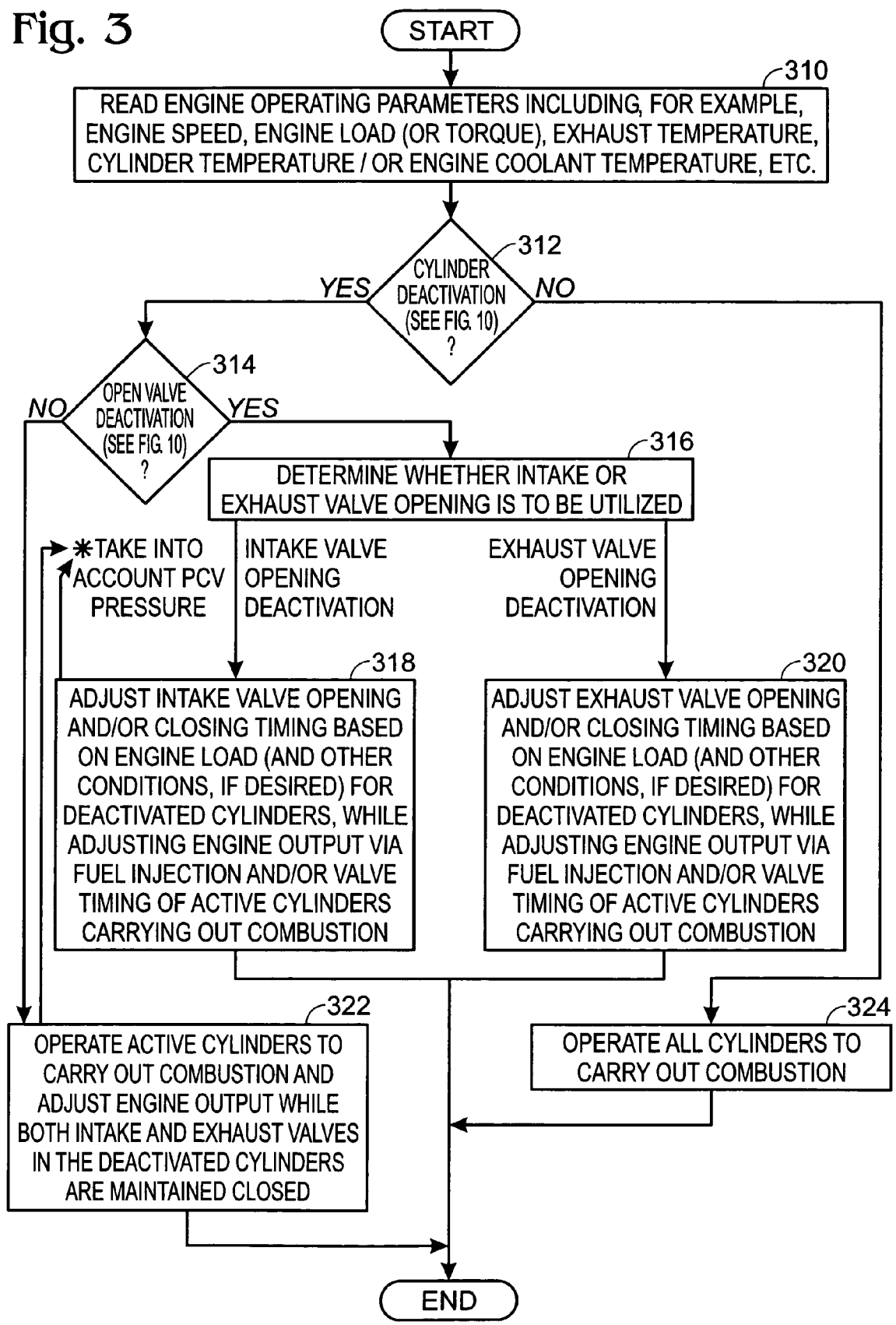
FIGS. 3 is a high level flowchart for use with the present invention.

Referring now to FIG. 3, a routine is described for selecting the engine operating mode and the valve deactivation mode. As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

Figure 10:
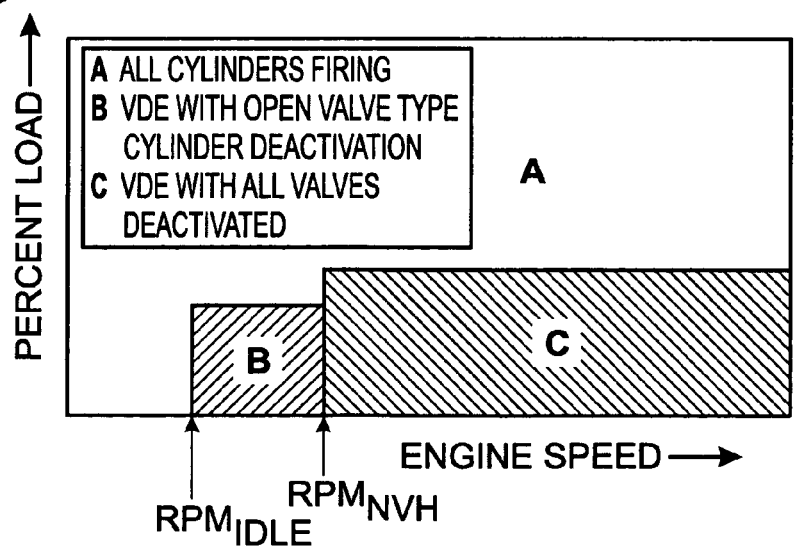
FIG. 10 shows a graph illustrating operating modes of an example embodiment of the present invention.

First, in step 310, the routine reads engine operating parameters including, for example: engine speed, engine load (or torque), exhaust temperature, cylinder temperature/engine coolant temperature, and various other parameters. Next, in step 312, the routine determines the number of cylinders to deactivate and which cylinders are to be deactivated. In other words, the routine can alternately deactivate different cylinder groups, as well as different cylinders within the cylinder groups. In one example, the routine selects whether to enable cylinder deactivation based on engine speed and load as indicated in FIG. 10, described below herein. However, other example approaches can be used based on desired engine torque or various other conditions such as, for example: exhaust temperature, cylinder temperature, engine coolant temperature, battery voltage, and various others.

When the answer to step 312 is YES, the routine continues to step 314. In step 314, the routine determines whether to utilize open valve deactivation, or closed valve cylinder deactivation. Again, one example approach is described in FIG. 10, discussed below herein. Specifically, whether to enable open valve deactivation, or closed valve deactivation, is based on determination of the current engine speed and load compared with threshold speed and load values. Alternatively, other parameters can be used to determine the cylinder deactivation type, such as, for example: desired engine torque and engine speed, battery voltage, and various other parameters.

When the answer to step 314 is YES, the routine continues to step 316. In step 316, the routine determines whether intake or exhaust valve opening is to be utilized during the open valve deactivation. Specifically, as discussed above, either opening of the intake valve on the deactivated cylinders, or opening of the exhaust valve on the deactivated cylinders can be utilized to reduce engine torque variation. The determination of whether to utilize intake or exhaust valve opening during cylinder deactivation can be based on various engine operating conditions, or can be selected to alternate between intake and exhaust of opening deactivated cylinders. When intake valve opening deactivation is selected, the routine continues to step 318. Alternatively, when exhaust valve deactivation is selected, the routine continues to step 320.

Note that when using an open intake valve(s) for deactivated cylinders, the exhaust valve(s) are maintained closed. Alternatively, when using an open exhaust valve(s) for deactivated cylinders, the intake valve(s) are maintained closed. In one example, the timing is such that this prevents any unwanted net gas flow through the engine, which could effect aftertreatment performance, aftertreatment temperatures, etc. By adjusting net airflow through the engine, is it possible to provide several benefits, such as exhaust system cooling, or supplying oxygen to the exhaust for generating an exotherm during cold start operation.

In step 318, the routine adjusts the intake valve opening and/or closing timing (of intake valves on the deactivated cylinders) based on engine load and various other conditions if desired. In addition, this adjustment of intake valve opening and/or closing time is performed while adjusting engine output via the fuel injection and/or valve timing of the active cylinders carrying out combustion. Furthermore, the fuel injection to the deactivated cylinders (with intake valve opening) is stopped. Note that the adjustment of the intake valve opening and/or closing timing on the deactivated cylinders is selected based on engine operating conditions to provide engine torque balancing across the engine condition operating range. Specifically, variation in the intake valve opening and/or closing time can be mapped as a function of engine load to provide optimum engine torque balancing across a range of engine operating parameters.

Likewise, in step 320, the routine adjusts exhaust valve opening and/or closing time based on engine load (and/or other conditions if desired) for the deactivated cylinders. Furthermore, while performing the adjustment of the exhaust valve opening and/or closing time on the deactivated cylinders, engine output is adjusted via fuel injection and/or valve timing of the active cylinder carrying out combustion. As in step 318, the routine adjusts the opening and/or closing time on the deactivated cylinders as a function of engine operating conditions (such as engine load) to optimize the net engine torque balancing (thereby minimizing engine vibration) across a range of engine operating parameters.

Continuing with FIG. 3, when the answer to step 314 is NO, the routine continues to step 322 to operate the active cylinders to carry out combustion. Furthermore, in step 322 the routine operates the cylinders selected for deactivation to operate with both the intake and exhaust valves in the closed position during the engine cycle. Furthermore, in step 322, the routine adjusts engine output via adjusting the air flow and/or injected fuel in the active cylinders carrying out combustion.

Finally, when the answer to step 312 is NO, the routine continues to step 324 to operate all cylinders to carry out combustion.

Note that in the above description, example operation was described for cylinders having an intake and an exhaust valve. Note that the cylinders can have multiple intake valves and/or multiple exhaust valves. Furthermore, the routine can perform identical operation on all the respective intake and exhaust valves of a cylinder or can perform deactivation of simply one of the intake, and one of the exhaust, valves of the cylinder.

Figure 4A:
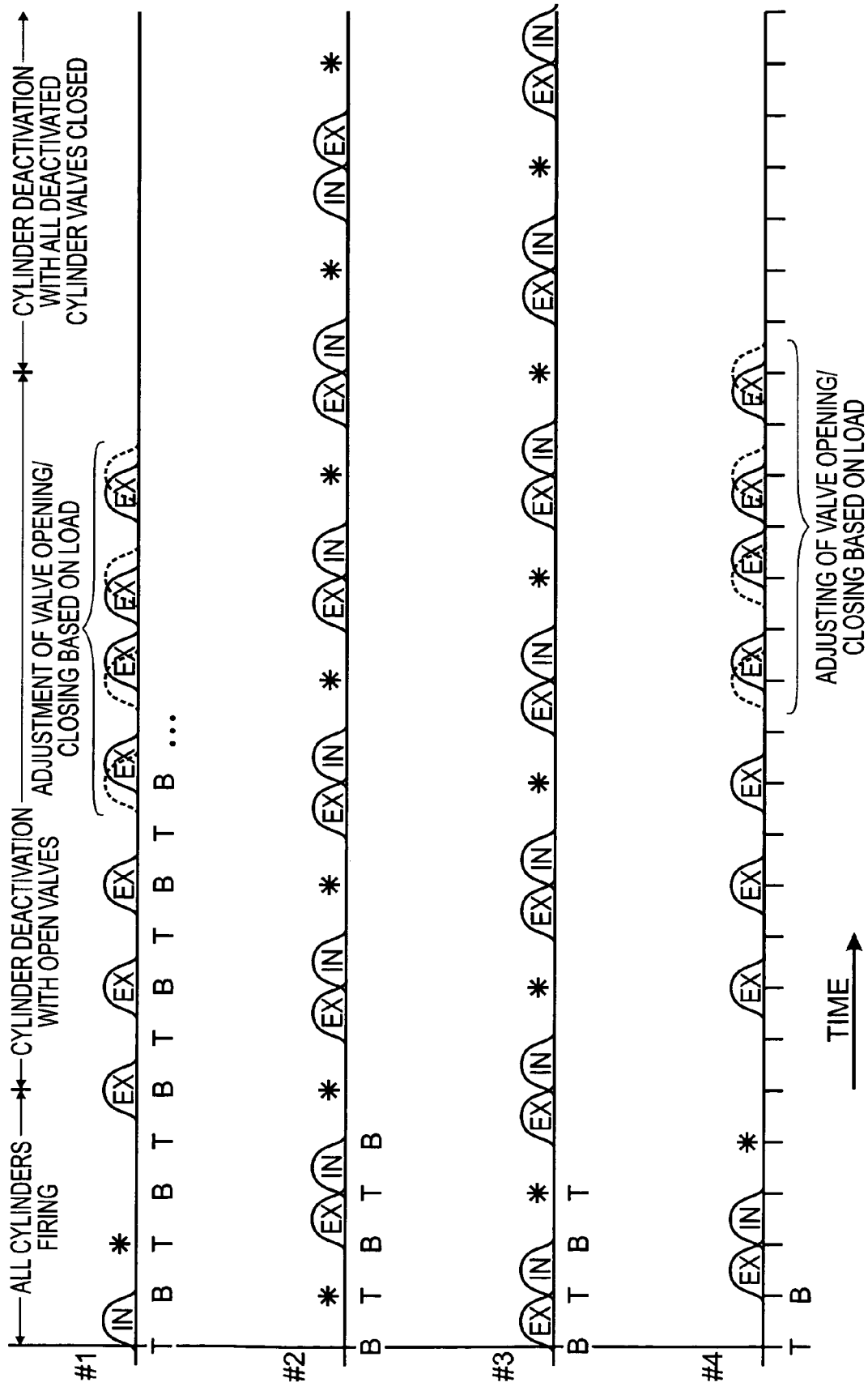

Referring now to FIG. 4A, a first timing chart of engine operation is described according to example operation according to one embodiment. The figure shows a four cylinder engine, indicating the location of the piston (T=top dead center, and B=bottom dead center). An asterisk indicates a firing of air and fuel in the cylinder. Furthermore, the valve lift is indicated for either the intake valve (IN) or the exhaust valve (EX). The figure indicates three modes of operation in the present invention. First, all the cylinders are firing. Then, the figure shows operation with cylinder deactivation and open valve injection, specifically open exhaust valve injection. In addition, the routine indicates how exhaust valve opening and closing time of the deactivated cylinders can be adjusted to improve overall engine torque balancing. Finally, the figure illustrates deactivation with the deactivated cylinders operating with all the intake and exhaust valves maintained closed. Note that in the cylinder deactivation mode with open valves, it is not required to open either the intake, or the exhaust valve, during every cycle. Rather, for example, the exhaust valve can be opened every several cycles to account for leakage of exhaust gas out of the cylinder. In addition, if the valves are not opened every cycle on the deactivated cylinders, the routine can specifically request the exhaust valves be opened on a cycle where engine operating conditions have changed so that a new desired exhaust valve opening and/or closing timing is requested to reduce engine torque imbalance.

Referring now to FIGS. 4B-4E, timing charts for engine operation of a V8 engine are shown in various modes of operation. The engine here has a firing order of 1-5-4-2-6-3-7-8. Vertical lines indicate the location of top and bottom dead center, while the labels i, c, p, and e indicate what would normally be the intake, compression, power, and exhaust stroke. The intake and exhaust open events are shown in solid and dashed lines respectively.

Figure 4B:
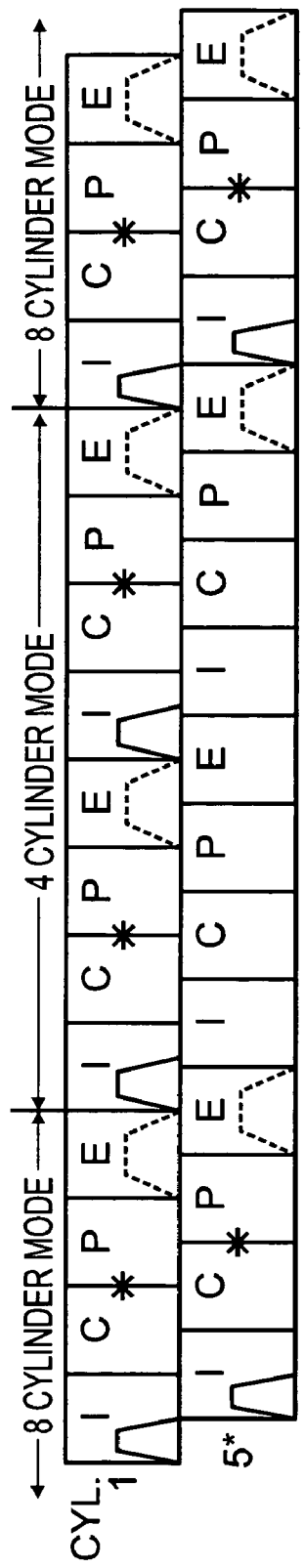

Referring now to FIG. 4B, a timing chart for 2 cylinders of a V8 engine is shown, where valve deactivation with all deactivated cylinder valves closed is used. Initially, cylinders 1 and 5, are running in V8 operating mode, with both cylinders firing as indicated shown by the asterisk, which indicates ignition. When the engine transitions to 4-cylinder mode, the exhaust stroke of cylinder 5 is completed, fuel injection and ignition are disables and both the intake and exhaust valve remain closed for subsequent cycles. Cylinders 2, 3, and 8 (not shown) are also deactivated, while cylinders 1, 4, 6, and 7 remain firing. This gives an even firing pattern for the engine in 4-cylinder mode. When full V8 mode is desired cylinder 5 (and 2, 3, and 8) is reactivated as shown in the figure. As discussed in the Background of the Invention, such an approach as in FIG. 4B has associated disadvantages in that torque imbalance between firing and non-firing cylinders can cause increase noise, vibration, and/or harshness.

Figure 4C:
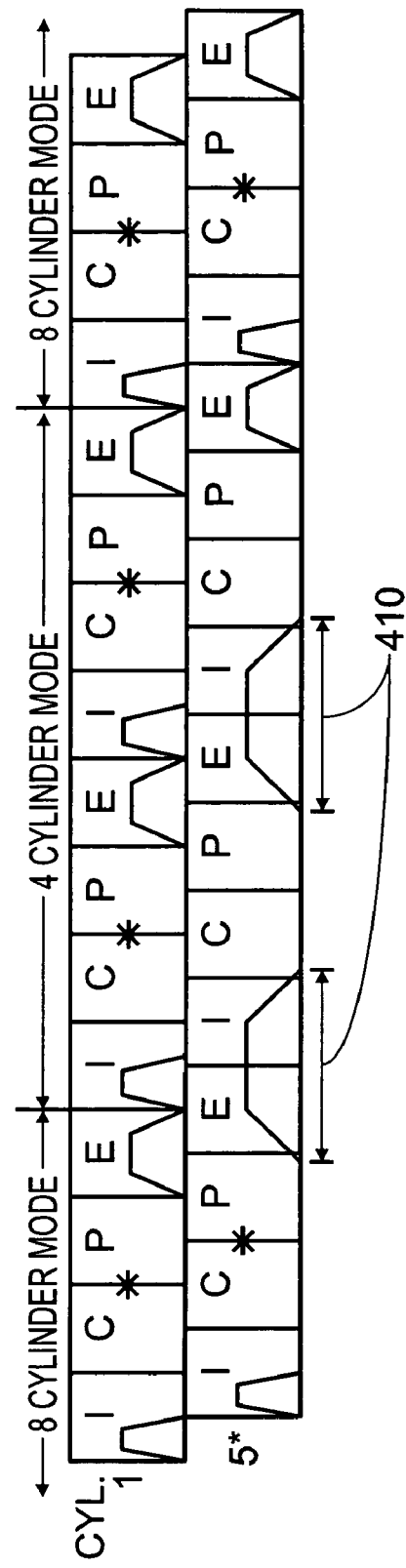

FIG. 4C shows the cylinder deactivation where the intake valves are closed and the exhaust valves remain open to provide higher in cylinder pressures to provide torque cancellation and fill-in. Specifically, this shows an example of exhaust open type deactivation with a long duration. Here the engine first operates in V8 mode. To transition to 4-cylinder mode, the exhaust remains open through the intake stroke, and then closes past BDC of intake to set the desired pressure level (cylinders 2, 3, and 8 are similar). While in 4-cylinder mode, fuel injection and ignition are deactivated along with the intake valves. Further, the duration can be tuned to set pressure levels in the deactivated cylinders as a function of load, if desired, as indicated by arrows 410.

FIG. 4D shows cylinder deactivation where the intake valves open and close while the exhaust valves are closed. This is referred to as an example of intake open type deactivation with a long duration. The transitions are indicated in a manner similar to that of FIG. 4C. Further, the duration can be tuned to set pressure levels in the deactivated cylinders as a function of load, if desired, as indicated by arrows 420.

FIG. 4E shows an example of a short duration exhaust open type deactivation, where the exhaust valve is opened ahead of bottom dead center and then closed shortly after bottom dead center. Here the opening can be intermittent depending on cylinder leak-down, heat transfer, and load changes. Intake valves are closed. Also, as indicated by arrow 430, it is possible to tune the duration to set pressure level in deactivated cylinders as a function of load. Note that valve can be opened intermittently to set desired pressure level based on load, cylinder leak-down and heat loss rates, etc.

Figure 5:
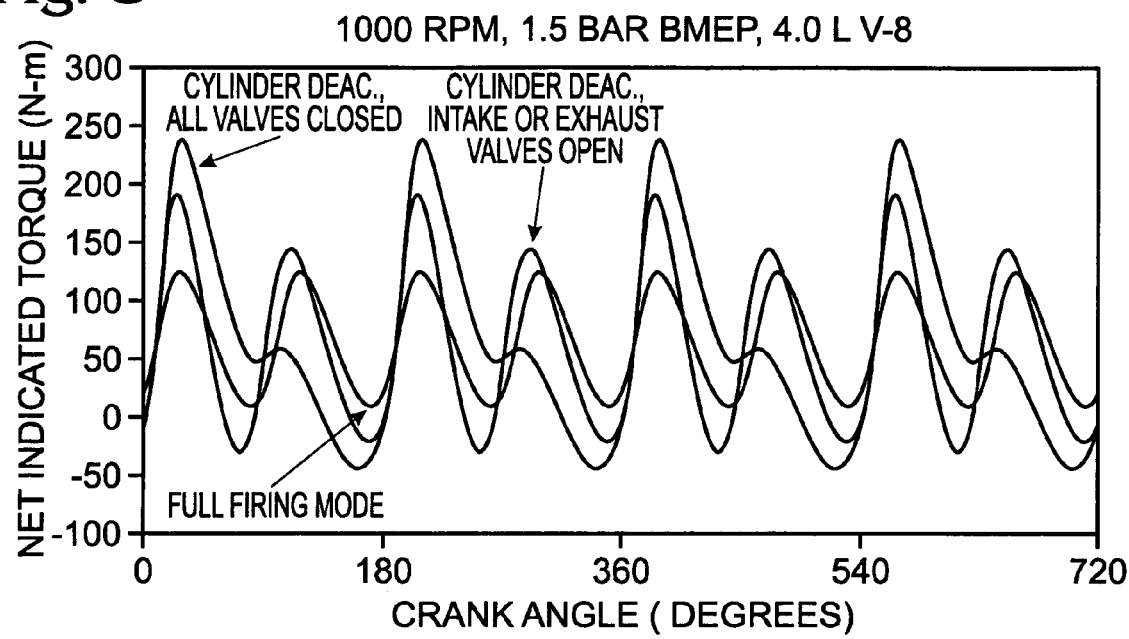
FIGS. 5-9 and 11-12 show experimental and simulation data.

Example features of the invention can be further described by comparing the in-cylinder pressures and subsequent crankshaft output torque associated with various modes of VDE operation. FIG. 5 shows an estimate of the indicated engine output torque for a V-8 operating at 1000 RPM and 1.5 bar BMEP load.

Conventional operation (all cylinders firing) is shown as well as cylinder deactivation modes, where ½ of the cylinders are deactivated to operate in 4-cylinder mode. The indicated torque shown in the figure is simply constructed from the individual in-cylinder pressure traces, and the crank-train geometry and mass parameters. Both a cycle simulation model and data measured on an EVA engine can be used to obtain the in-cylinder pressure data.

As shown in FIG. 5, cylinder deactivation can significantly increase the amplitude (or "AC" component) of the torque signal relative to full-firing if full valve deactivation is used. In contrast, if the intake or exhaust valves are opened at an appropriate or selected time during the engine cycle, the compression torque of the non-firing cylinders offsets some of the normal firing stroke torque output, and the positive expansion torque fills in the torque gap that occurs between firing events. This decreases the amplitude of the signal and essentially doubles the frequency at lighter engine loads, thus permitting more aggressive use of cylinder deactivation over the drive cycle. The higher frequency enables the driveline torsional damper and engine mounts to more effectively reduce the transmission of vibrations. Thus, a storage and release of energy into the non-firing cylinders is optimally phased to reduce the torsional vibrations transmitted to the driveline and vehicle structure.

Figure 6:
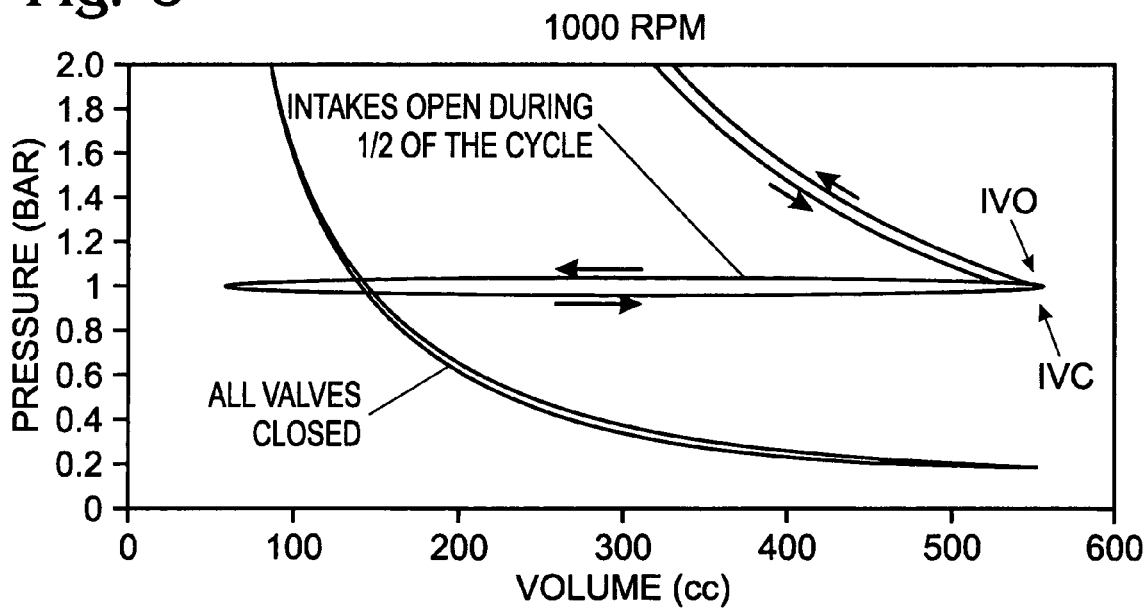

FIG. 6 shows in-cylinder pressure-volume diagrams for the deactivated cylinders for both full valve deactivation and partial valve deactivation. The simulations shown here are for fully unthrottled operation, where the intake manifold pressure is essentially atmospheric. The net mean effective pressure (or gas work performed over the engine cycle normalized by displacement) is a parasitic loss that can degrade fuel economy, and is represented by the area enclosed in the diagram. While the open valve type deactivation cycle has a higher loss, the losses are low compared to other parasitics, and cylinder deactivation in both cases represents a large fuel economy benefit. If the range of cylinder deactivation operation is extended due to the improved torque characteristics of open valve deactivation, the additional fuel economy benefits can more than offset the increased gas work losses. In fact, with fully flexible valve control (e.g. EVA), the engine control strategy could be switched between full valve deactivation at higher engine speeds (where torsional vibration problems are less severe) and open valve deactivation at lower speeds (where flow losses will be less evident).

Figure 7:
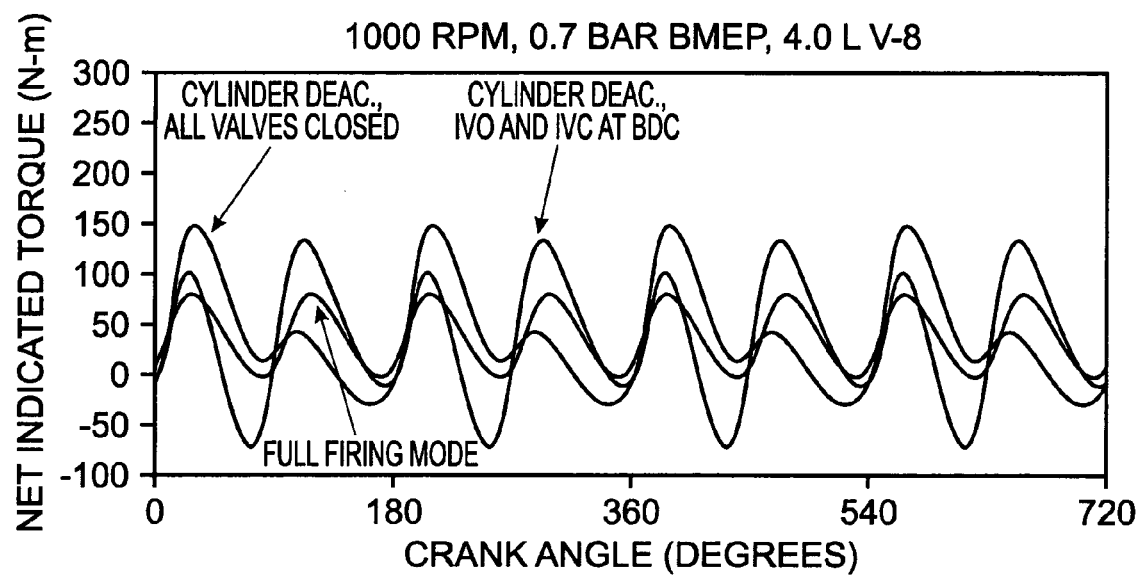
Figure 8:
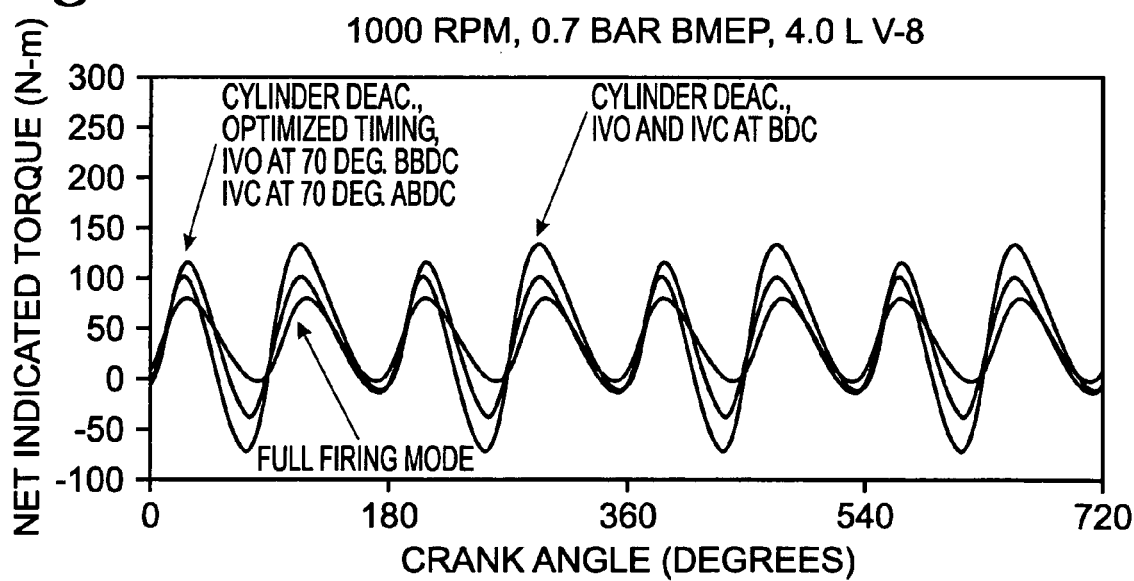
Figure 9:
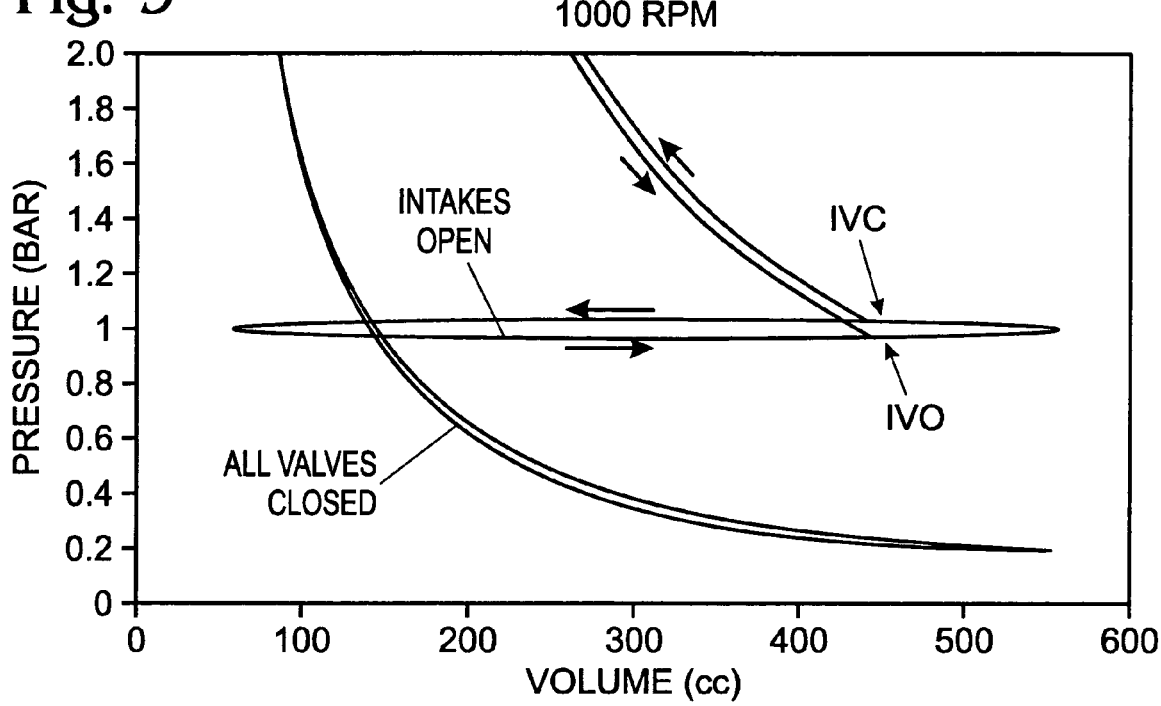

FIG. 7 shows the torque signature where the net engine load is now reduced to 0.7 bar BMEP. Here, there are similar trends if full valve deactivation is used and the result is a larger amplitude, lower frequency torque output. If the valve timings shown in FIG. 6 (IVO and IVC occur at BDC) are used for the deactivated cylinders, the motoring torque peaks actually exceed the firing torque peaks. By adjusting the opening and closing valve timing so that the valve closes either before or after BDC and so that the valve opens before BDC, the torque can be optimized to produce a more uniform result. This is shown in FIG. 8, which illustrates a more uniform amplitude for the optimized opening and closing valve timings. The pressure-volume diagrams for this case are shown in FIG. 9 for the late valve closure case.

FIG. 10 schematically illustrates an example of some of the different operating regions of the engine as a function of engine speed and load. All cylinders are fired to operate the engine normally when the required torque output exceeds that achievable with cylinder deactivation. When the load is achievable with ½ of the cylinders deactivated, and the RPM is above the vibration constrained level of $RPM_{NVH}$, cylinder deactivation may be employed with all of the valves deactivated. When the engine speed drops below $RPM_{NVH}$, the open valve deactivation described above is employed to improve NVH and to achieve cylinder deactivation in lower speed lighter load regions.

Figure 11:
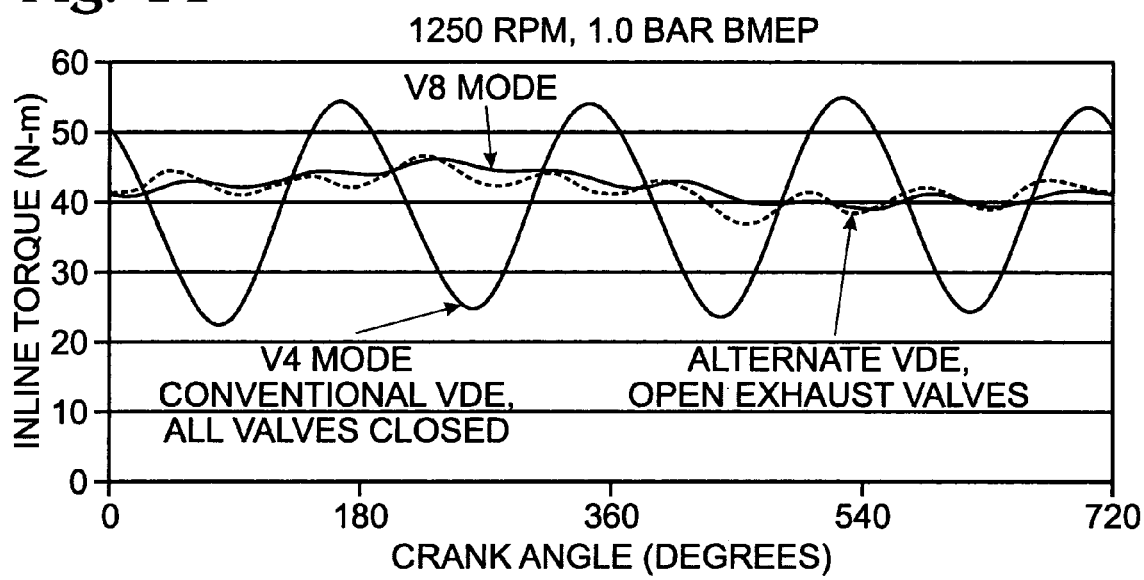

FIG. 11 shows torque data measured on a 8-cylinder EVA engine operating at 1250 RPM and 1.0 bar BMEP where the open valve type deactivation is compared with closed valve cylinder deactivation. The torque shown is measured at the input to the dynamometer and was downstream of the engine flywheel and output shaft damper system, so that there is some filtering of the output torque from the crankshaft. Note that the amplitude of the torque signal is substantially reduced from about 30 N-m to about 10 N-m by using open valve deactivation, and is similar to that produced by the full-firing engine.

Figure 12:
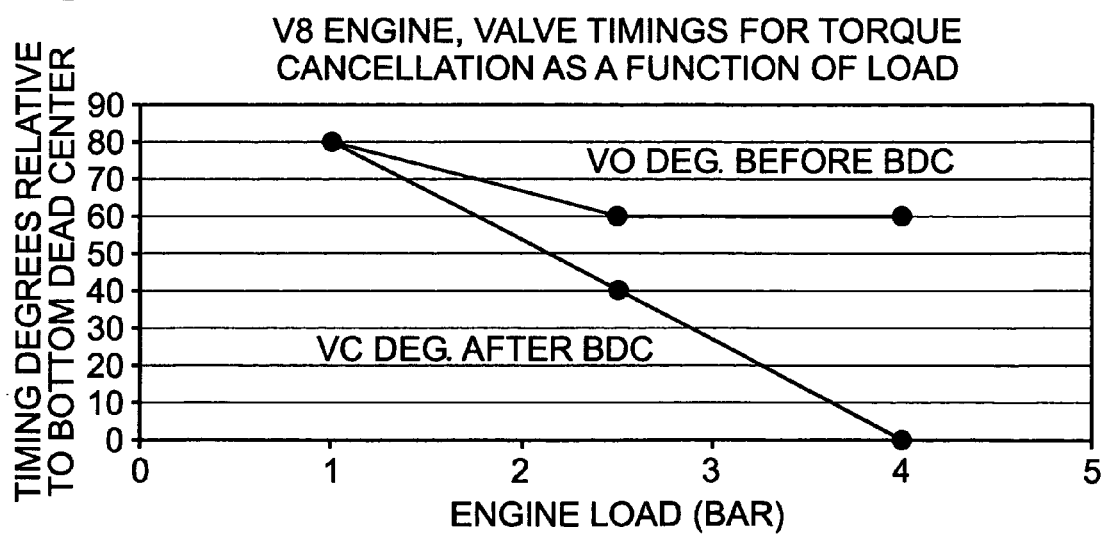

Referring now to FIG. 12, a graph showing how valve closing and valve opening timing for deactivated cylinders vary as a function of engine load.

This figures shows the valve timings which were used to optimize the torque cancellation as a function of engine load for a V8 engine operating at 1250 RPM. As load increases valve opening and closing timings move closer to bottom dead center. This increases the compression torque for the nonfiring cylinders to better cancel out the higher firing cylinder torque. It also increases the expansion torque to fill in the torque signal between firing events.

This concludes the description of the invention. The reading of it by those skilled in the art would bring to mind many alterations and modifications without departing from the spirit and the scope of the invention. Accordingly, it is intended that the scope of the invention be defined by the following claims:

We claim:

1. A system for an engine having at least a first and second cylinder, the cylinders each having at least an intake and an exhaust valve, the system comprising:
   a controller configured to:
      operate the engine in a first mode where at least both the first cylinder and second cylinder open and close at least both their respective intake and exhaust valves to induct air, combust said air with injected fuel, and exhaust combusted gas products;
      operate the engine in a second mode where at least one of the first cylinder and second cylinder opens and closes its intake and exhaust valves to induct air, combust said air with injected fuel, and exhaust combusted gas products, and the other of said first and second cylinders opens and closes at least one of its intake or exhaust valves while maintaining at least the other of its intake or exhaust valves closed during a cycle of the engine;
      operate the engine in a third mode where one of said first and second cylinders operates with at least both intake and exhaust valves closed during a cycle of the engine; and
      selecting at least one of said first, second and third modes based on an operating condition, where said second mode is selected at a lower engine speed than said third mode for at least one condition.

2. The system recited in claim 1, wherein said fuel is injected directly into the engine cylinder.

3. The system recited in claim 1, wherein said fuel is injected indirectly into an intake port of the engine.

4. The system recited in claim 1, wherein said control is further configured to provide a fourth mode where at least both the first cylinder and second cylinder open and close at least both their respective intake and exhaust valves to induct air, without injected fuel.

5. The system recited in claim 1, wherein said controller is further configured to select from said first, second and third modes based on an engine operating condition.

6. The system recited in claim 1, wherein said controller is further configured, during said third mode, to operate the other of said cylinders to open and close at least both its respective intake and exhaust valves to induct air, combust said air with injected fuel, and exhaust combusted gas products.

7. The system recited in claim 1, wherein said operating condition is an engine operating condition.

8. The method recited in claim 7, wherein said engine operating condition is an engine load.

9. The system recited in claim 1, wherein said controller is further configured to stop fuel injection to deactivated cylinders.

10. The system recited in claim 1, wherein said controller is further configured to adjust valve opening and closing times in said second mode of said group opening its exhaust valve while maintaining at least its intake closed, wherein said adjusting is based on engine load and speed.

11. The system recited in claim 1, wherein said controller is further configured to maintain pressure in deactivated cylinders above crank case pressure to reduce oil consumption during selected conditions.

12. The system recited in claim 1, wherein during said second mode, the other of said first and second cylinders opens and closes at least an exhaust valve while maintaining at least an intake valve closed.

13. The system recited in claim 1, wherein during said second mode, the other of said first and second cylinders opens and closes at least an intake valve while maintaining at least an exhaust valve closed.

14. A system for an engine having at least a first and second cylinder, the cylinders each having at least an intake and an exhaust valve, the system comprising:
   a controller configured to:
      operate the engine in a first mode where at least both the first cylinder and second cylinder open and close at least both their respective intake and exhaust valves to induct air, combust said air with injected fuel, and exhaust combusted gas products;
      operate the engine in a second mode where at least one of the first cylinder and second cylinder opens and closes its intake and exhaust valves to induct air, combust said air with injected fuel, and exhaust combusted gas products, and the other of said first and second cylinders opens and closes at least its exhaust valve while maintaining at least its intake valve closed during a cycle of the engine;
      operate the engine in a third mode where one of said first and second cylinders operates with at least both intake and exhaust valves closed during a cycle of the engine; and
      selecting at least one of said first, second and third modes based on engine speed, where said second mode is selected at lower engine speeds than said third mode.

15. The system recited in claim 13, wherein said fuel is injected directly into the engine cylinder.

16. The system recited in claim 13, wherein said fuel is injected indirectly into an intake port of the engine.

17. The system recited in claim 13, wherein said control is further configured to provide a fourth mode where at least both the first cylinder and second cylinder open and close at least both their respective intake and exhaust valves to induct air, without injected fuel.

18. The system recited in claim 13, wherein said controller is further configured to select from said first, second and third modes based on engine load.

19. The system recited in claim 13, wherein said controller is further configured, during said third mode, to operate the other of said cylinders to open and close at least both its respective intake and exhaust valves to induct air, combust said air with injected fuel, and exhaust combusted gas products.

20. The system recited in claim 13, wherein said controller is further configured to stop fuel injection to deactivated cylinders.

21. The system recited in claim 13, wherein said controller is further configured to adjust valve opening and closing times in said second mode of said group opening its exhaust valve while maintaining at least its intake closed, wherein said adjusting is based on engine load.

22. The system recited in claim 13, wherein said controller is further configured to maintain pressure in deactivated cylinders above crank case pressure to reduce oil consumption during selected conditions.

23. A system for an engine having at least a first and second cylinder, the cylinders each having at least an intake and an exhaust valve, the system comprising:
   a controller configured to:
      operate the engine in a first mode where at least both the first cylinder and second cylinder open and close at least both their respective intake and exhaust valves to induct air, combust said air with injected fuel, and exhaust combusted gas products;
      operate the engine in a second mode where at least one of the first cylinder and second cylinder opens and closes its intake and exhaust valves to induct air, combust said air with injected fuel, and exhaust combusted gas products, and the other of said first and second cylinders opens and closes at least one of its intake or exhaust valves while maintaining at least the other of its intake or exhaust valves closed during a cycle of the engine;
      operate the engine in a third mode where at least both the first cylinder and second cylinder are operated without injected fuel; and
      selecting at least one of said first, second and third modes based on engine speed, where for at least an operating condition, said third mode is selected at a higher engine speed than said second mode.

24. The system of claim 23 wherein during said second mode, the other of said first and second cylinders operates without fuel injection.

* * * * *